(No Model.)

E. C. BOWLING.
STAY FOR GARMENTS.

No. 362,568. Patented May 10, 1887.

WITNESSES:
C. W. Russell.
B. T. Wheeler

INVENTOR:
Enoch C. Bowling
By
Roscoe B. Wheeler
atty

United States Patent Office.

ENOCH C. BOWLING, OF YPSILANTI, MICHIGAN, ASSIGNOR OF ONE-HALF TO HENRY P. GLOVER, OF SAME PLACE.

STAY FOR GARMENTS.

SPECIFICATION forming part of Letters Patent No. 362,568, dated May 10, 1887.

Application filed March 18, 1886. Serial No. 195,677. (No model.)

*To all whom it may concern:*

Be it known that I, ENOCH C. BOWLING, a citizen of the United States, residing at Ypsilanti, in the county of Washtenaw and State of Michigan, have invented certain new and useful Improvements in Stays for Garments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to stays for garments—such as dresses, corsets, and the like; and it consists in the combination of certain parts, and in the manner of securing said parts together, as hereinafter set forth, and pointed out particularly in the claim.

Figure 1:
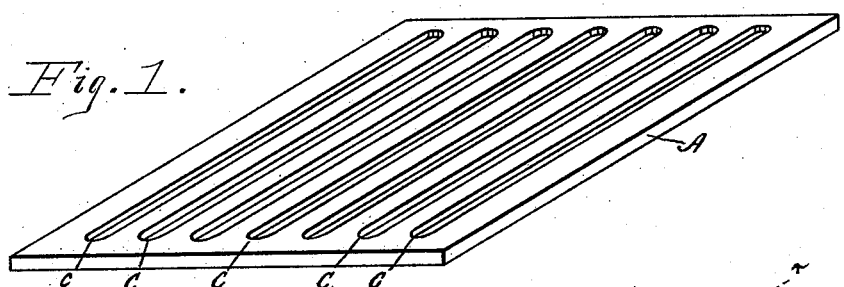
Figure 2:
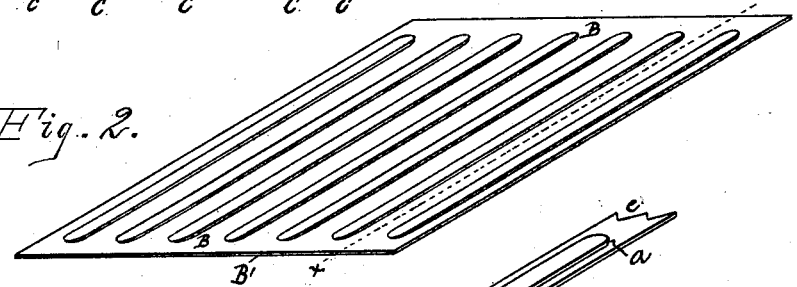
Figure 3:
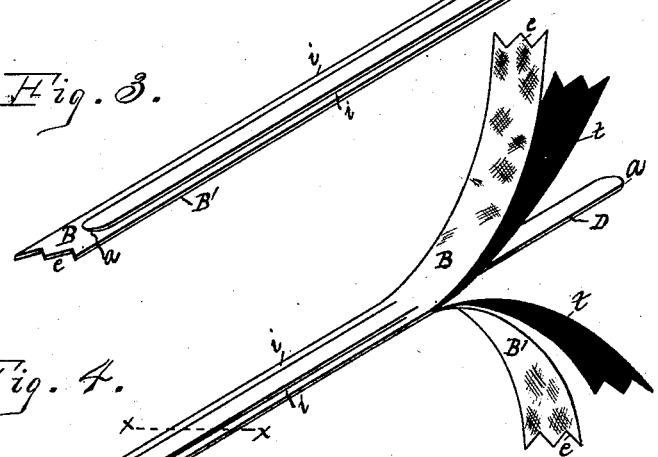
Figure 4:
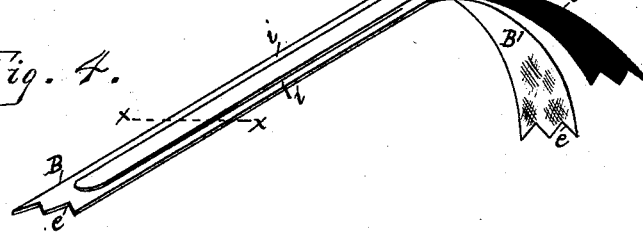
Figure 5:
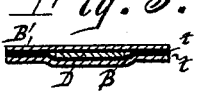

In the drawings forming a part of this specification, Figure 1 is a view of the forming or mold plate upon which the parts of the stay are united. Fig. 2 represents a sheet of the manufactured article as removed from the plates of Fig. 1. Fig. 3 represents the stay proper. Fig. 4 is a view of same, in which the parts forming the stay at the right are disconnected. Fig. 5 is an enlarged inverted cross-section on dotted line $x\ x$ of Fig. 4.

The stay consists of two outer coverings of fabric, B B', which may be of any suitable cloth. The central part or stiffener, D, may be of steel, whalebone, wood, or any suitable material that is flexible.

In Fig. 4 I show the strips of rubber $t\ t$, which I locate between the stiffener D and the outer fabrics, as also shown in Fig. 5. The rubber should be unvulcanized and very thin.

The parts constituting the stay, when placed in position, are subjected to pressure between heated clamps or plates, whereby the rubber strips become softened or melted, thereby passing into the meshes of the covering fabrics around and over the stiffener, the rubber sheets joining each other, so that when congealed they form a solid mass, firmly cementing the parts together, inclosing the stiffener D within a rubber covering, thus holding said parts firmly in position between the fabrics; and when using steel for the stiffeners D the rubber prevents moisture or perspiration from the body of the wearer from reaching the stiffener, thereby preventing the rusting of the steel, as is now common with steel stays.

It has been common to form in a dress or garment a series of pockets by stitching, then to insert a steel or whalebone stiffener into each pocket. This is quite expensive, and as the stiffeners are loose they soon wear through the garment and drop out.

The fabrics B B' covering the stiffener D, I cut wider than the stiffener, thus forming a stitching-edge, $i$, along each side, and by stitching through the fabrics along the edges $i\ i$ and into the garment the stays are firmly held in position, thus dispensing with the pockets now in common use. The fabrics covering the stiffener D, I cut or form longer than the stiffener, so that the rubber may firmly join the fabrics at the ends $e\ e$, thus preventing the working endwise of the stiffener. The rubber joining the fabrics together prevents fraying or tearing of the parts.

The stay is put together as follows: The metal plate A is provided with a series of depressions or pockets, C, in its upper face. Said pockets are made sufficiently long and wide enough to receive freely the stiffener D and fabric B. The plate A is first warmed. The fabric B is then laid over the plate; then a sheet, $t$, of rubber. Then I place upon the rubber a series of stiffeners, one over each depression C of the plate; then over the series of stiffeners a like sheet of rubber, then over the last sheet of rubber the fabric B'. Then I place on the upper fabric a flat heated plate, whereby the stiffeners D will be pressed into the pockets C of the lower plate. The heat from the plate melts or softens the sheets of rubber, causing the parts to be firmly united, as before stated. The upper or pressure plate is then removed. The fabrics are then lifted from the plate A, and when turned over appear as shown in Fig. 2; and to obtain a single stay I cut, by means of a knife or shears, through the fabrics and rubber, between the stiffeners D, along the dotted line $x\ x$ of Fig. 2, thus forming the stay, as shown in Fig. 3.

If desired, several stiffeners secured between the fabrics may be attached to the garment in sheet form. A single strip of rubber may be used between the fabrics and over the stiffeners to secure the parts together without departing from the nature of my invention.

I round the ends of the stiffener, as shown at *a*, to avoid sharp corners and to give the stay a good appearance.

Having thus fully set forth my invention, what I claim as new, and desire to secure by Letters Patent, is—

The stay herein described, comprising the stiffening-blade D, having sheets of rubber *t t* lying upon each side thereof and projecting over the edges and ends of said blade, with the covering fabrics B B', having a like projection and adhering thereto, whereby a stitching-edge is provided surrounding the stiffening-blade, as and for the purposes specified.

In testimony whereof I affix my signature in presence of two witnesses.

ENOCH C. BOWLING.

Witnesses:
R. B. WHEELER,
B. F. WHEELER.